(12) United States Patent
Immel et al.

(10) Patent No.: US 11,210,568 B2
(45) Date of Patent: Dec. 28, 2021

(54) SYSTEMS AND METHODS FOR ANGULAR FEATURE EXTRACTION FROM SATELLITE IMAGERY

(71) Applicant: Ursa Space Systems Inc., Ithaca, NY (US)

(72) Inventors: Poppy Gene Immel, Ithaca, NY (US); Daniela Irina Moody, Los Alamos, NM (US); Meera Ann Desai, Sebastopol, CA (US)

(73) Assignee: Ursa Space Systems Inc., Ithaca, NY (US)

( * ) Notice: Subject to any disclaimer, the term of this patent is extended or adjusted under 35 U.S.C. 154(b) by 92 days.

(21) Appl. No.: 16/824,310

(22) Filed: Mar. 19, 2020

(65) Prior Publication Data
US 2020/0302247 A1    Sep. 24, 2020

Related U.S. Application Data

(60) Provisional application No. 62/820,696, filed on Mar. 19, 2019.

(51) Int. Cl.
*G06K 9/62*    (2006.01)
*G06K 9/00*    (2006.01)
(Continued)

(52) U.S. Cl.
CPC ....... *G06K 9/6277* (2013.01); *G06K 9/00201* (2013.01); *G06K 9/4604* (2013.01); *G06N 3/08* (2013.01)

(58) Field of Classification Search
CPC ............. G06K 9/6277; G06K 9/00201; G06K 9/4604; G06K 9/4628; G06N 3/08; G06N 3/0481; G06N 3/0454
See application file for complete search history.

(56) References Cited

U.S. PATENT DOCUMENTS

2019/0138849 A1 *    5/2019    Zhang ................. G06K 9/6215

OTHER PUBLICATIONS

[No Author Listed], Education and Research Program. Planet Labs Inc. 2020:11 pages. https://www.planet.com/markets/education-and-research/ [last accessed May 26, 2020].
(Continued)

*Primary Examiner* — Christopher Wait
(74) *Attorney, Agent, or Firm* — Wolf, Greenfield & Sacks, P.C.

(57) ABSTRACT

In some aspects, there is provided a method for determining a rotational orientation of an object in an image. The image depicts the object in a scene. The method includes providing images depicting the object in the scene to a trained statistical model. The images depict the scene of the image at different rotation angles. A rotation angle of a respective image corresponds to a potential rotational orientation of the object depicted in the respective image. The method further includes, in response to the providing, receiving, for each image, a confidence score indicating a likelihood generated by the trained statistical model that the object is at the potential rotational orientation corresponding to the rotation angle of the respective image. The method further includes determining the rotational orientation of the object in the image based at least in part on an analysis of the confidence scores and respective potential rotational orientations.

24 Claims, 17 Drawing Sheets

(51) Int. Cl.
  *G06N 3/08* (2006.01)
  *G06K 9/46* (2006.01)

(56) References Cited

OTHER PUBLICATIONS

Bergstra et al., Random search for hyper-parameter optimization. Journal of machine learning research. Feb. 13, 2012:281-305.
Castelluccio et al., Land use classification in remote sensing images by convolutional neural networks. arXiv preprint arXiv:1508.00092. Aug. 1, 2015;1:1-11.
Chen et al., Vehicle detection in satellite images by hybrid deep convolutional neural networks. IEEE Geoscience and remote sensing letters. Mar. 25, 2014;11(10):1797-801.
Cheng et al., Learning rotation-invariant convolutional neural networks for object detection in VHR optical remote sensing images. IEEE Transactions on Geoscience and Remote Sensing. Sep. 5, 2016;54(12):7405-15.
Czogiel et al., Response surface methodology for optimizing hyper parameters. Dortmund University. 2006:1-24.
Dahl et al., Improving deep neural networks for LVCSR using rectified linear units and dropout. 2013 IEEE international conference on acoustics, speech and signal processing. May 26, 2013:8609-8613.
Di Francescomarino et al., Genetic algorithms for hyperparameter optimization in predictive business process monitoring. Information Systems. May 1, 2018;74:67-83.
Furukawa, Savers: SAR ATR with verification support based on convolutional neural network. arXiv preprint arXiv:1805.06298. May 14, 2018;1:23-28.
Hinton, A practical guide to training restricted Boltzmann machines. University of Toronto. Aug. 2, 2010;1:21 pages.
Howard, Some improvements on deep convolutional neural network based image classification. arXiv preprint arXiv:1312.5402. Dec. 19, 2013:6 pages.
Hutter et al., Sequential model-based optimization for general algorithm configuration. International conference on learning and intelligent optimization. Jan. 17, 2011:507-523.
Hutter, Automated configuration of algorithms for solving hard computational problems. The University of British Columbia. Oct. 2009:292 pages.
Kattan et al., Systematic evaluation of CNN on land cover classification from remotely sensed images. Proceedings of SPIE, Image and Signal Processing for Remote Sensing XXIV Oct. 9, 2018;10789:10 pages.
Krizhevsky et al., Imagenet classification with deep convolutional neural networks. Advances in neural information processing systems. 2012:1-9.
Larochelle et al., An empirical evaluation of deep architectures on problems with many factors of variation. Proceedings of the 24th international conference on Machine learning. Jun. 20, 2007:473-480.
Lecun et al., Gradient-based learning applied to document recognition. Proceedings of the IEEE. Nov. 1998;86(11):2278-2324.
Li et al., Hyperband: A novel bandit-based approach to hyperparameter optimization. The Journal of Machine Learning Research. Jan. 1, 2017; 18(1):1-52.
Maggiori et al., Convolutional neural networks for large-scale remote-sensing image classification. IEEE Transactions on Geoscience and Remote Sensing. Oct. 19, 2016;55(2):645-57.
Makantasis et al., Deep supervised learning for hyperspectral data classification through convolutional neural networks. 2015 IEEE International Geoscience and Remote Sensing Symposium (IGARSS). Jul. 26, 2015:4959-4962.
Nareyek, Choosing search heuristics by non-stationary reinforcement learning. Metaheuristics: Computer decision-making. 2003:1-22.
Nogueira et al., Towards better exploiting convolutional neural networks for remote sensing scene classification. ArXiv preprint arXiv:1602.01517. Feb. 4, 2016;1:1-27.
Sermanet et al., Overfeat: Integrated recognition, localization and detection using convolutional networks. ArXiv preprint arXiv:1312.6229. Feb. 24, 2014;4:1-16.
Simonyan et al., Very deep convolutional networks for large-scale image recognition. ArXiv preprint arXiv:1409.1556. Apr. 10, 2015;6:1-14.
Snoek et al., Practical bayesian optimization of machine learning algorithms. Advances in neural information processing systems. 2012:1-9.
Snoek et al., Scalable bayesian optimization using deep neural networks. International conference on machine learning. Jun. 1, 2015:2171-2180.
Snoek, Bayesian optimization and semiparametric models with applications to assistive technology. University of Toronto. 2013:129 pages.
Xia et al., AID: A benchmark data set for performance evaluation of aerial scene classification. IEEE Transactions on Geoscience and Remote Sensing. Apr. 24, 2017;55(7):3965-81.
Zeiler et al., Visualizing and understanding convolutional networks. European conference on computer vision. Sep. 6, 2014:818-833.

\* cited by examiner

SYSTEMS AND METHODS FOR ANGULAR FEATURE EXTRACTION FROM SATELLITE IMAGERY

CROSS REFERENCE TO RELATED APPLICATION

This Application claims priority under 35 U.S.C. § 119(e) to U.S. Provisional Patent Application Ser. No. 62/820,696, filed Mar. 19, 2019, and entitled "SYSTEMS AND METHODS FOR ANGULAR FEATURE EXTRACTION FROM SATELLITE IMAGERY," which is hereby incorporated by reference in its entirety.

BACKGROUND

Deep learning has been successfully applied to remote sensing images for image classification and spatial feature extraction. Convolutional Neural Networks (CNNs) in particular have been used in remote-sensing applications to perform scene recognition, image classification, object detection, and segmentation; specifically for automatic target recognition, land-cover classification, and scene and object classification such as vehicle detection.

SUMMARY

In some aspects, described herein are techniques, including a method, for determining a rotational orientation of an object in an image. For example, the object may be an angular feature of interest on a cylindrical base. The image depicts the object in a scene. The method includes providing a plurality of images depicting the object in the scene to a trained statistical model. The plurality of images depict the scene of the image at a different rotation angle. The method further includes, in response to the providing, receiving one or more potential rotational orientations of the object and, for each of the one or more potential rotational orientations, a confidence score indicating a likelihood generated by the trained statistical model that the object is at the potential rotational orientation. The method further includes determining the rotational orientation of the object in the image based at least in part on an analysis of the confidence score for each of the one or more potential rotational orientations.

In some aspects, there is provided a method for determining a rotational orientation of an object in an image. The image may depict the object in a scene. The method includes providing a plurality of images depicting the object in the scene to a trained statistical model. The plurality of images may depict the scene of the image at different rotation angles, wherein a rotation angle of a respective image corresponds to a potential rotational orientation of the object depicted in the respective image. The method further includes, in response to the providing, receiving, for each of the plurality of images, a confidence score indicating a likelihood generated by the trained statistical model that the object is at the potential rotational orientation corresponding to the rotation angle of the respective image. The method further includes determining the rotational orientation of the object in the image based at least in part on an analysis of the confidence scores and respective potential rotational orientations.

In some embodiments, determining the rotational orientation of the object in the image includes determining a respective potential rotational orientation with a highest confidence score.

In some embodiments, the plurality of images depicting the object in the scene is generated from a single image. In some embodiments, the plurality of images includes n, e.g., 48, images generated by rotating the single image to n, e.g., 48, different rotation angles. In some embodiments, the plurality of images is generated by successively rotating the single image in a fixed increment. In some embodiments, the fixed increment is d, e.g., 7.5 degrees, thereby yielding a set of 360°/d images, e.g., a fixed increment of 7.5 degrees resulting in 360°/7.5° or 48 rotated images.

In some embodiments, the statistical model includes a binary classification model. In some embodiments, the binary classification model includes a binary classification convolutional neural network (CNN).

In some embodiments, the statistical model includes k statistical models trained to generate k confidence scores. In some embodiments, the k statistical models include k CNNs. In some embodiments, determining the rotational orientation of the object in the image includes determining a respective potential rotational orientation with a highest average confidence score across the k statistical models.

In some embodiments, the plurality of images includes n images depicting the scene of the image at n different rotation angles.

In some embodiments, the image belongs to a temporal series of m images depicting the object in the scene.

In some embodiments, the method further includes determining the rotational orientation of the object in the temporal series of m images based at least in part on an analysis of, from each plurality of n images for the temporal series of m images, the k confidence scores received from the plurality of k trained statistical models in response to the providing of the plurality of n images.

In some embodiments, determining the rotational orientation of the object in the temporal series of m images includes determining a plurality of n average confidence scores for the n different rotation angles, each average confidence score being based on mk confidence scores, received from the plurality of k trained statistical models, for m images corresponding to a same rotation angle from the plurality of n images for each of the temporal series of m images.

In some embodiments, the object is depicted in the image in a non-periodic manner.

In some embodiments, only one instance of the object is depicted in the image.

In some embodiments, the object depicted in the image is non-moving.

In some embodiments, no labeling is provided of the object depicted in the image.

In some aspects, there is provided a method for determining a rotational orientation of an object in an image. The image may depict the object in a scene. The method includes providing a plurality of images depicting the object in the scene to a trained statistical model to obtain an output relating to the rotational orientation of the object in the image. The plurality of images may depict the scene of the image at a different rotation angle. The statistical model may be trained to generate a confidence score indicating whether the object is depicted in an input image at a fixed rotational orientation. Providing the plurality of images to the trained statistical model may include, for each image of the plurality of images, providing the image to the trained statistical model as the input image, and receiving in response to the providing of the image a confidence score generated by the trained statistical model indicating whether the image depicts the object at the fixed rotational orientation. The method further includes determining the rotational orientation of the object in the image based at least in part on an analysis of confidence scores received from the trained statistical model in response to the providing of the plurality of images.

In some aspects, there is provided a method for determining a rotational orientation of an object in a temporal series of images. The temporal series of images may depict an object in a scene. The method includes, for each image in a temporal series of m images, providing a plurality of n images depicting the object in the scene to a plurality of k trained statistical models to obtain an output relating to the rotational orientation of the object. The plurality of n images may depict the scene of the image at n different rotation angles. The plurality of k statistical models may be trained to generate k confidence scores indicating whether the object is depicted in an input image at a fixed rotational orientation. Providing the plurality of n images to the plurality of k trained statistical models may include, for each image of the plurality of n images, providing the image to the plurality of k trained statistical models as the input image, and receiving, in response to the providing of the image, k confidence scores generated by the plurality of k trained statistical models indicating whether the input image depicts the object at the fixed rotational orientation. The method further includes determining the rotational orientation of the object in the temporal series of m images based at least in part on an analysis of, from each plurality of n images for the temporal series of m images, the k confidence scores received from the plurality of k trained statistical models in response to the providing of the plurality of n images.

In some embodiments, determining the rotational orientation of the object in the temporal series of m images may include determining a plurality of n average confidence scores for the n different rotation angles, each average confidence score being based on mk confidence scores, received from the plurality of k trained statistical models, for m images corresponding to a same rotation angle from the plurality of n images for each of the temporal series of m images.

In some aspects, there is provided at least one computer-readable storage medium having encoded thereon executable instructions that, when executed by at least one processor, cause the at least one processor to carry out a method for determining a rotational orientation of an object in an image. The image may depict the object in a scene. The method includes providing a plurality of images depicting the object in the scene to a trained statistical model. The plurality of images may depict the scene of the image at different rotation angles, wherein a rotation angle of a respective image corresponds to a potential rotational orientation of the object depicted in the respective image. The method further includes, in response to the providing, receiving, for each of the plurality of images, a confidence score indicating a likelihood generated by the trained statistical model that the object is at the potential rotational orientation corresponding to the rotation angle of the respective image. The method further includes determining the rotational orientation of the object in the image based at least in part on an analysis of the confidence scores and respective potential rotational orientations.

In some aspects, there is provided an apparatus comprising at least one processor and at least one storage medium having encoded thereon executable instructions that, when executed by the at least one processor, cause the at least one processor to carry out a method for determining a rotational orientation of an object in an image. The image may depict the object in a scene. The method includes providing a plurality of images depicting the object in the scene to a trained statistical model. The plurality of images may depict the scene of the image at different rotation angles, wherein a rotation angle of a respective image corresponds to a potential rotational orientation of the object depicted in the respective image. The method further includes, in response to the providing, receiving, for each of the plurality of images, a confidence score indicating a likelihood generated by the trained statistical model that the object is at the potential rotational orientation corresponding to the rotation angle of the respective image. The method further includes determining the rotational orientation of the object in the image based at least in part on an analysis of the confidence scores and respective potential rotational orientations.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
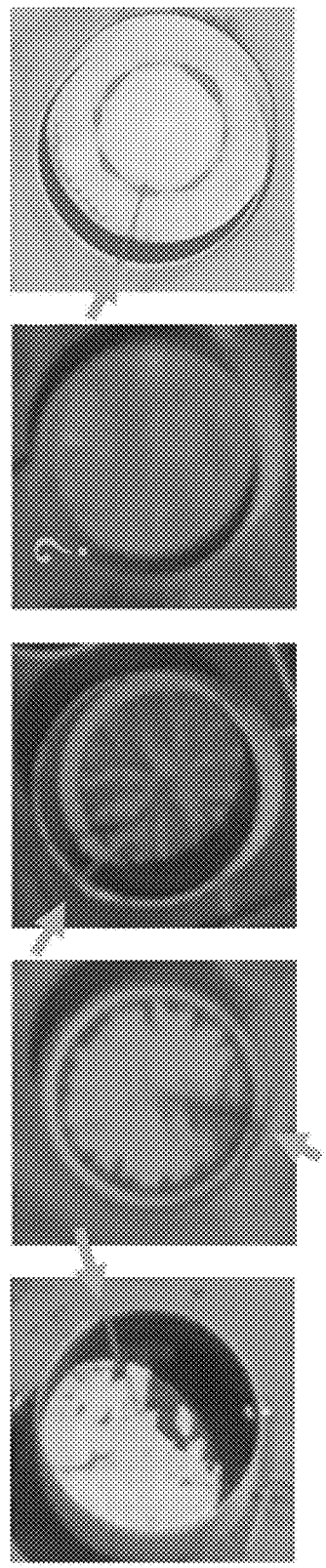
FIG. 1 shows exemplary images suitable for angular feature extraction, in accordance with some embodiments of the technology described herein.

Described herein are techniques for analyzing an input image to determine an orientation of an object in the image and/or for extracting one or more angular features of the object from the image. The image may depict a scene that includes the object. The object for which the orientation and/or feature is determined may be a single instance of the object in the image, and in some cases may be the only object of its type in the image. The object may have a shape or appearance that is non-periodic, such that there is no repeating feature in the object for which orientation is to be determined. The object may have a linear structure. Determining the orientation and/or feature may include determining how the object is placed in the scene and, in some embodiments and/or for some objects, may include determining an axis of the object or a direction along with the object extends. In some embodiments, the orientation or feature of the object is a rotational orientation or other angular feature, indicating how the object lies (from a top-down perspective) on a circle with respect to an orientation (e.g., a rotation defined as 0 degrees). In some embodiments, applications of the described techniques may include identification of linear or elongated features against fixed objects or background, such as inlet pipes for oil storage and water storage tanks, irrigation pipes, train tracks, vehicles, ships, and other suitable features.

The image may be a remotely sensed image. For example, the image may be a Multispectral Satellite image (MSI) generated by a space-based satellite sensor and the object and scene may be Earth-based as imaged by the multispectral sensor. In some such embodiments, a number of images may be captured of the object and scene as the sensor passes over the area of the scene while orbiting the Earth. In some embodiments, at least one captured image of the object includes an optical image, e.g., an image composed of light captured from the visible spectrum. In some embodiments, the image may be captured using Synthetic Aperture Radar (SAR), Light Detection and Ranging (LIDAR), or another suitable means.

A trained classifier may be used in some embodiments as part of determining the orientation (including, for example, rotational orientation) of the object in the image. In some embodiments, to determine orientation of the image, a classification technique is performed. For example, to determine the orientation of the image, a binary classification technique may be performed. Binary classification techniques may be used to classify something into one of only two classes. Rotational orientation is itself not binary (circles are often described using 360 degrees). However, the inventors have recognized and appreciated that binary classification is advantageous for use in reliably determining orientation of an object. In some embodiments, the input image that is to be analyzed may be used to generate multiple different images, each of which depicts the scene with the object. After generation, each of the multiple images may be analyzed with a binary classifier to generate, with the binary classifier, an indication of orientation of the object in that image. Results of the classification of the multiple images may then be used to determine the rotational orientation of the object in the input image. In some embodiments, the trained classifier may include an M class classifier where M is the number of rotational increments of the input image to generate the multiple images. The results of such a multi-class classifier may directly provide the rotational orientation of the object in the input image. Examples of such processes are described below.

Conventionally, determination of rotational orientation for content of images was limited to objects with a repeating/periodic element that is depicted in the image. In such cases, a domain transform in the frequency domain may be used to identify the periodic feature in the image. Once the periodic feature was identified, a rotation could be extracted from analysis of the periodic feature. This could be used, for example, in agriculture by identifying rows of crops in a field and then determining, from the rows of crops, an orientation of all of those rows of crops.

There have not been techniques conventionally available, however, for analyzing images with non-repeating features or objects to reliably determine an orientation of such objects. This is because while periodic features in an image present as a clear signal in the frequency domain, a non-repeating feature may not be detectable in a similar manner. Images having periodic features (or patterns or textures), such as images of vineyards or orchards, may include repeatable structures with some spatial frequency and orientation (also referred to as periodic 2D signals). Conventional techniques may be used to analyze such periodic 2D signals, e.g., using Fourier transforms that leverage the relationship between periodicity in the image domain and power spectral density in the frequency domain. However, lacking the clear signal in the frequency domain, the conventional techniques are not useful for feature extraction from images with an object having only a single static and/or oriented geometric feature, e.g., a runway in a field, a road in a desert, or another such image or object. This may especially be a problem in cases where the feature of interest comprises a small portion of pixels in the captured image and/or is subject to noise in the captured image. In such cases, this feature may not be apparent in the frequency domain.

The inventors have further recognized and appreciated that CNNs were developed for analyzing images to determine whether an image includes a pattern or matches a pattern. CNNs were not traditionally used for feature extraction, and were not traditionally used for extraction of angular features or for determining orientation of objects in images.

The inventors have developed a machine learning approach using CNNs for angular feature extraction from an image with an instance of a non-moving object. The described techniques may perform angular feature extraction to detect an orientation of the object in the image. Furthermore, the described techniques may perform the angular feature extraction from the image without need for any labeling or segmentation of the non-moving object in the image. In some embodiments, the inventors have developed machine learning approaches for angular feature extraction from multispectral satellite data fused with other remote sensing datasets.

For example, the inventors have leveraged satellite imagery to measure roughly 10,000 crude oil storage tanks every week across the globe. To model these tanks with increased fidelity, the inventors have proposed use of CNNs as described herein. Some techniques described herein may be used together with such CNNs for identifying the orientation with respect to true north of an inlet pipe, which is one common feature located on the top of a cylindrical oil storage tank. Though, it should be appreciated that inlet pipe orientation is merely one exemplary use case for orientation determination. Embodiments are not limited to being used with inlet pipe orientation determination, or with determining orientation of components of equipment, and can be used in other contexts to determine orientation of other objects. In addition, while various examples described herein include use of CNNs, it should be appreciated that these are merely illustrative examples to illustrate the described techniques and that embodiments are not limited to operating with CNNs or any particular type of CNN. Embodiments may use other suitable machine learning algorithms, including other suitable classifiers or other suitable neural networks.

The inventors have developed a method for determining a rotational orientation of an object in an image, where the image depicts the object in a scene. In some embodiments, a plurality of images, depicting the object in the scene at a different rotation angle, are provided to a trained statistical model. The plurality of images may be generated by incrementally rotating a single image at different rotation angles. For example, the image may be rotated in 7.5 degree increments to generate 48 different rotated images. For example, the statistical model may include a binary classification model, such as a binary classification CNN. In response to providing the plurality of images to the trained statistical model, one or more potential rotational orientations of the object are received. For each of the potential rotational orientations, a confidence score is received, indicating a likelihood generated by the trained statistical model that the object is at the potential rotational orientation. The rotational orientation of the object in the image is determined based at least in part on an analysis of the confidence score for each of the one or more potential rotational orientations. For example, a potential rotational orientation with a highest confidence score may be determined to be the rotational orientation of the object in the image.

In some embodiments, a two-phase approach may be used for determining this orientation: first, a CNN is used to probabilistically determine a coarse orientation of the inlet pipe, and second, a maximum likelihood voting scheme is used to automatically extract the location of the angular feature within 7.5 degrees. In some embodiments, a systematic technique may also be used to determine a suitable deep learning CNN architecture for the specific problem and under user-defined constraints by selecting model hyperparameters (e.g., number of layers, size of the input image and filters, and dataset preprocessing) using a grid search approach. The use of this systematic approach for hyperparameter selection may yield increased accuracy for the angular feature extraction algorithm (e.g., from 86% to 94%) and may be extended to similar applications.

In some embodiments, given the complexity and depth of deep learning networks, some embodiments may include evaluating and selecting hyperparameters of the network that increase performance, in addition to adjusting any data preprocessing for a specific deep learning problem. Deep learning has been successfully applied to remote sensing images for image classification and spatial feature extraction, and CNNs in particular have been used in remote-sensing applications to perform scene recognition, image classification, object detection, and segmentation; specifically for automatic target recognition, land-cover classification, and scene and object classification such as vehicle detection. The problem of rotational invariance of objects and features often arises in the field of object detection in remote sensing applications, given that the specific satellite look angle and acquisition geometry is not user-adjustable or consistent. In some embodiments, rotationally invariant objects may not be identified, but rather their orientation, or angular difference with respect to a fixed orientation (e.g., true north or another angle), may be determined. In some embodiments, selecting suitable hyperparameters of a CNN for angular feature extraction in the domain of remote sensing may be considered an innovation at the domain intersection of feature extraction problems and remote sensing applications.

In some embodiments, hyperparameter adjustment in deep learning networks may help in increasing overall accuracy and/or computational performance. The inventors appreciated that such increases in accuracy and performance may be achieved in some embodiments using some approaches for selecting hyperparameters including: grid search, in which hyperparameters are varied in constant intervals and some or all possible configurations are sampled; random search, in which random configurations are sampled; and other parameter search algorithms, e.g., optimization algorithms, such as Bayesian Optimization, in which a probability model is used to determine the most promising hyperparameters. Grid search is effective for problems with a small search space, but typically random search and standard parameter search algorithms, e.g., standard optimization algorithms, are more efficient methods both for determining which hyperparameters have the largest impact in the performance of a network, and for determining the correct values for these hyperparameters. In some embodiments, hyperparameter selection is performed to train a CNN to be able to extract angular features, specifically orientation of inlet pipes for oil storage tanks in application to an oil storage product. In some embodiments, the search space is manually selected and then a grid search is run across these parameters. This systematic approach looks to select hyperparameters for a CNN model including the number of layers, the size of the input image, and preprocessing performed prior to classification, so as to increase performance of the CNN. This systematic approach may be robust across a number of training sets and extends the use of CNNs and other deep learning networks to similar applications.

Hyperparameter Search and Selection

In some embodiments, a challenge in deep learning may be the coupled problem of determining not only network structure, but also hyperparameters for the network. One approach may be to manually select the parameters for the network and run a search across some or all combinations. This approach is a grid search across manually defined parameters and may be commonly used. Grid search has been applied to several learning tasks. Several modifications to the original architecture have also been proposed, with modifying different hyperparameters of the network structure and implementing a training strategy using a grid search approach.

Though grid search can yield higher performing CNNs, this approach may suffer from high computational requirements due to the vast hyperparameter search space, as the number of combinations increases exponentially with the number of hyperparameters. In some embodiments, random search may yield comparable, if not a better selection of hyperparameters. For example, random search can yield a better selection of hyperparameters by searching a larger parameter space than a manual grid search, since in most cases only a few hyperparameters have a high impact on the network performance. Some techniques may expand on random search to perform several iterations of the search, with each iteration resulting in further training of the top ranked parameters of the previous stage.

In some embodiments, other techniques have been applied to hyperparameter selection for deep learning networks as an outer loop to the learning process. Such techniques include modeling the learning algorithm as a Gaussian process and then applying Bayesian Optimization, using sequential model-based algorithms, leveraging Tree of Parzen estimators, and applying genetic algorithms. Other models besides a Gaussian process model may be explored and applied to benchmark object recognition tasks.

In some embodiments, sequential model-based hyperparameter selection creates models to approximate hyperparameter performance based on historical measurements. The Tree-structured Parzen Estimator approach is based on sequential model-based hyperparameter selection but models the hyperparameters as a generative process. Genetic algorithms have also been applied to hyperparameter tuning.

Though many state of the art hyperparameter selection techniques have been proposed and developed, manual and grid search may be used for several reasons: manual hyperparameter selection can provide more insight into why some values for hyperparameters yield better results, grid search is simple to implement and is reliable in low dimensional spaces. In some embodiments, relatively small CNNs with no more than 4 convolutional layers may be utilized and the grid search approach may be used to select the hyperparameters.

Angular Feature Extraction

In some embodiments in an oil/gas equipment context, an angular feature extraction task may be to extract the orientation of a specific object in satellite images; specifically, identify the location of a feature on the top edge of a cylindrical oil storage tank. This feature may be referred to as the tank's inlet pipe. For each tank, the inlet pipe may be in a fixed location on the top edge of the tank, as demonstrated in FIG. 1. This fixed location may be defined as the angular measure; in other words, the difference in degrees between the location of the feature on the circular edge of a tank from true north (which is considered to be at zero degrees). FIG. 1 shows five examples of the tank chips from the dataset. Each tank been rescaled to the same width and height. The arrows indicate the location of the inlet pipe feature located on the top of a cylindrical oil storage tank. In the fourth image chip, the location of the inlet pipe is unclear due to the poor image quality or inherent properties of the tank such as tank size or tank material.

In some embodiments, a set of satellite images provided by Planet Labs taken with their SkySat constellation is used. SkySat 2-7 are identical commercial satellites manufactured by Skybox Imaging collecting sub-meter resolution imagery and high-definition video. The sub-meter imagery may be used, specifically the visual Red/Green/Blue (RGB) bands, and converted to a single-band grayscale image using the openCV library. The dataset may cover approximately 720 tanks whose inlet pipes have been manually measured to provide a ground-truth. For each of these tanks, there may be multiple images available giving approximately 3500 total images. Each tank image may be chipped so that it covers 0.25 times the radius of the tank; this ensures that the edge of the tank is entirely visible.

In some embodiments, in order to automatically extract this angular feature across many tanks, a two-phase algorithm may be used that utilizes a CNN to identify if the inlet pipe is at a specified location and a voting algorithm to determine the most likely location of the inlet pipe for the possible positions. The algorithm performs as follows:

1. Binary Classification Phase: for each tank, a temporal series of m images is obtained. For example, the temporal series of m images includes m images captured over a period of time. For each image of a tank in this temporal series, a set of n, e.g., 48, images is created by rotating the original image in d=360°/n, e.g., 7.5-degree, increments. Each of these images is then fed through a binary classification CNN (FIG. 2) that has been trained to identify whether the inlet pipe is at 0 degrees, i.e., the northernmost point of the of the tank in the rotated image. A confidence will be returned for each rotation based on the output of the CNN, as illustrated in FIG. 3. For increased accuracy and robustness, this binary classification may be performed using k CNNs, each trained on k-folds of the training data. For example, k=5 may be selected. Discussion for this training data is provided further below.

2. Voting Phase: across the m images, part 1 returns mk votes for each d-increment rotation. Run an average voting scheme across the returned confidences, and the vote with the highest confidence is determined to be the angular location of the inlet pipe. If two or more locations have high confidence, then the measurement will not be made. This process is shown in FIG. 4.

Figure 2:
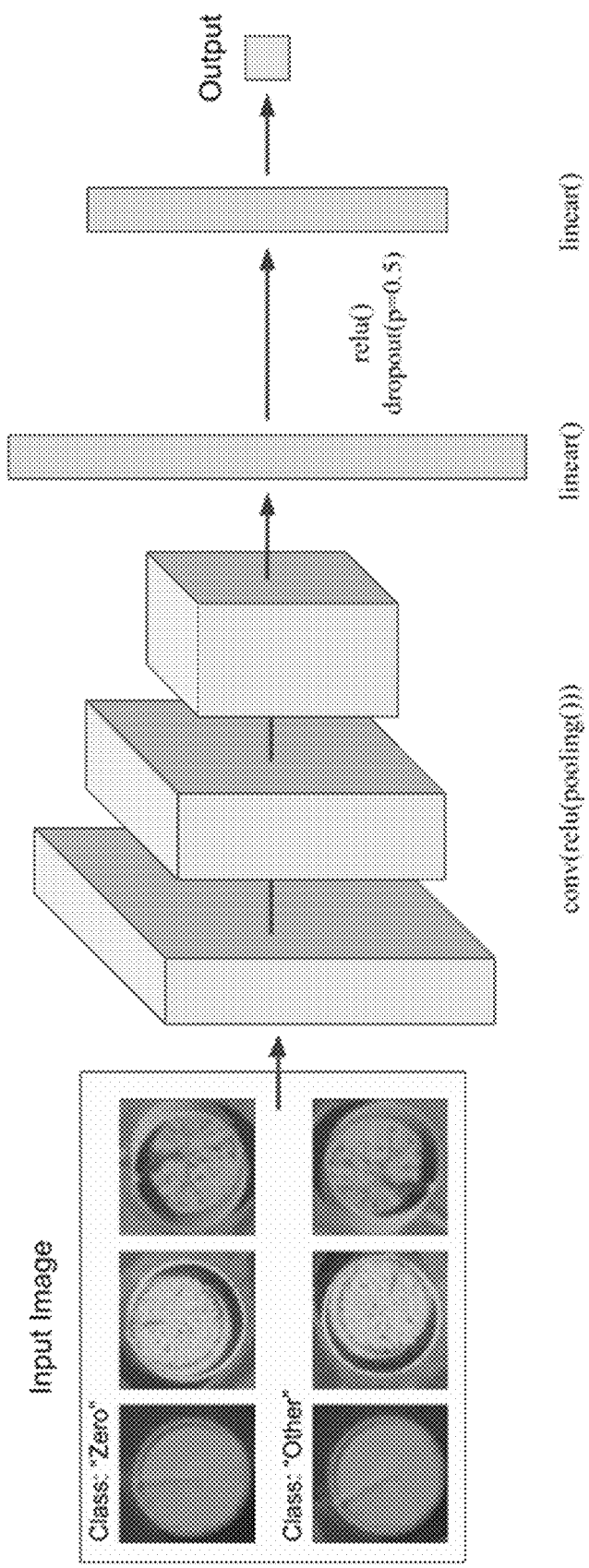
FIG. 2 shows a binary classification CNN for use in angular feature extraction, in accordance with some embodiments of the technology described herein.
Figure 3:
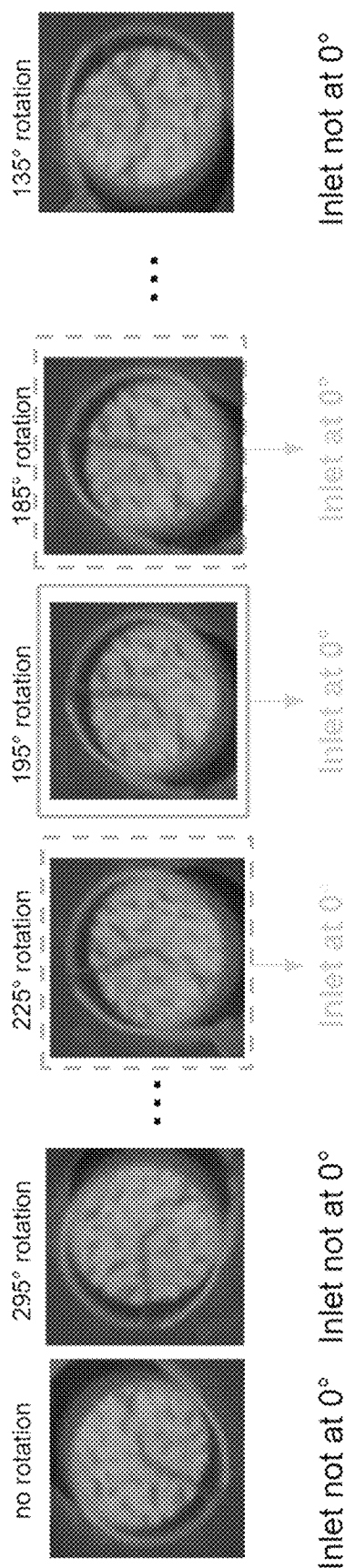
FIG. 3 illustrates exemplary outputs from the binary classification CNN of FIG. 2, in accordance with some embodiments of the technology described herein.

FIG. 2 shows a diagram demonstrating the binary classification part. The input is from two classes 'Zero' and 'Other', indicating whether the inlet's location is at the northernmost point of the tank cylinder top. In some embodiments, the CNN is generally structured as several convolutional layers for which maximum pooling is applied, followed by a linear layer, a ReLU activation with random dropout, and a second linear layer. The output gives a confidence as to whether the location of the inlet is at the northernmost point of that particular orientation of the tank.

FIG. 3 is a demonstration of the output of each rotation of the tank when fed through the binary CNN.

Figure 4:
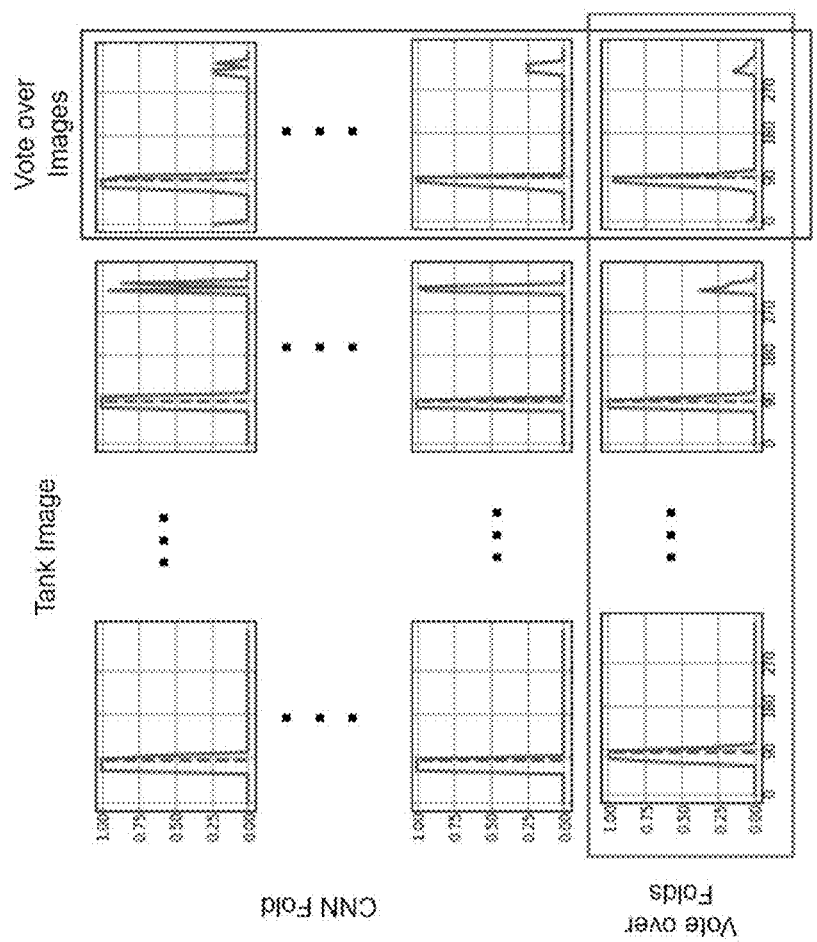
FIG. 4 illustrates a voting process for use in angular feature extraction, in accordance with some embodiments of the technology described herein.

FIG. 4 is an example of the voting part. The five CNNs trained on each of the k training data folds and the m images will each output a series of confidences corresponding to the 48 rotations of the tank, which can be inspected as a histogram. The dotted line indicates the known location of the inlet pipe based on visual inspection. A maximum likelihood voting algorithm is applied across the km outputs, with the output across the m images shown in the vertical box, and the output across the k folds shown in the horizontal box. The final voting output is shown in the overlap.

Figure 5:
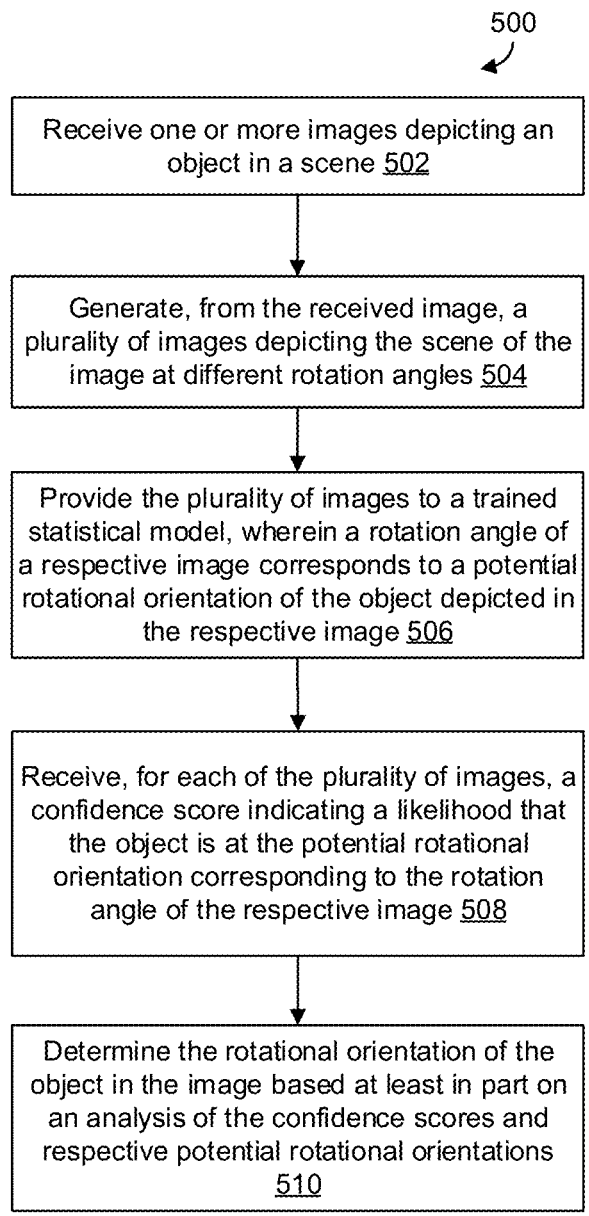
FIG. 5 shows a flow diagram for determining a rotational orientation of an object in an image, in accordance with some embodiments of the technology described herein.

FIG. 5 shows a flow diagram for a process 500 that may be carried out in some embodiments for determining a rotational orientation of an object in an image. The process 500 may, in some embodiments, be implemented as computer-executable instructions, e.g., as part of an angular feature extraction facility, executed by one or more processors of one or more suitable computing devices, such as a server or a desktop or laptop personal computer, a cloud computing platform or other distributed network of devices, or other suitable device(s).

Process 500 begins in block 502, in which the angular feature extraction facility receives one or more images depicting an object in a scene. In some embodiments, the object is depicted only once in the image, is non-moving, is non-periodic, and/or is unlabeled.

In block 504, the angular feature extraction facility generates a plurality of images depicting the scene of the received image at different rotation angles. In some embodiments, the plurality of images depicting the object in the scene is generated from a single image. For example, the plurality of images may include n images, e.g., 48 images, generated by rotating the single image to n different rotation angles. In this example, the plurality of images may be generated by successively rotating the single image in a fixed increment of d degrees, e.g., 7.5 degrees.

In block 506, the angular feature extraction facility provides the plurality of images depicting the object in the scene to a trained statistical model. A rotation angle of a respective image may correspond to a potential rotational orientation of the object depicted in the respective image. The statistical model may include a binary classification model, e.g., a binary classification CNN. In some embodiments, the statistical model may include k models, e.g., k CNNs.

In block 508, the angular feature extraction facility receives, for each of the plurality of images, a confidence score indicating a likelihood generated by the trained statistical model that the object is at the potential rotational orientation corresponding to the rotation angle of the respective image.

In block 510, the angular feature extraction facility determines the rotational orientation of the object in the image based at least in part on an analysis of the confidence scores and respective potential rotational orientations. For example, a potential rotational orientation with a highest confidence score may be determined to be the rotational orientation of the object in the image.

In embodiments where the statistical model includes k models, the angular feature extraction facility determines a potential rotational orientation with a highest average confidence score across the k models to be the rotational orientation of the object in the image. For example, each of the k models may output a series of confidence scores corresponding to the n different rotation angles of the image, where each rotation angle of the image corresponds to a potential rotational orientation of the object in the image. That is, each of n potential rotational orientations of the object may receive k confidence scores from the k models. The angular feature extraction facility may apply an average voting scheme, or another suitable scheme, across the k confidence scores for each of the n potential orientations to determine a potential rotational orientation of the object with the highest average confidence score.

In embodiments where a temporal series of m images is analyzed using k statistical models, the angular feature extraction facility determines a potential rotational orientation with a highest average confidence score across the m images and the k models to be the rotational orientation of the object. For example, for each of the m images, the k models may each output a series of confidence scores corresponding to the n different rotation angles of the image. That is, each of n potential rotational orientations of the object may receive mk confidence scores from the k models across the m images. For each of the m images, the angular feature extraction facility may apply an average voting scheme, or another suitable scheme, across the k confidence scores for each of the n potential orientations to determine a potential rotational orientation with the highest average confidence score for the image. Finally, the angular feature extraction facility may apply an average voting scheme, or another suitable scheme, across the average confidence scores for the m images to determine the rotational orientation for the object in the temporal series of images, e.g., as illustrated in and described with respect to FIG. 4.

Network Architecture

Figure 6:
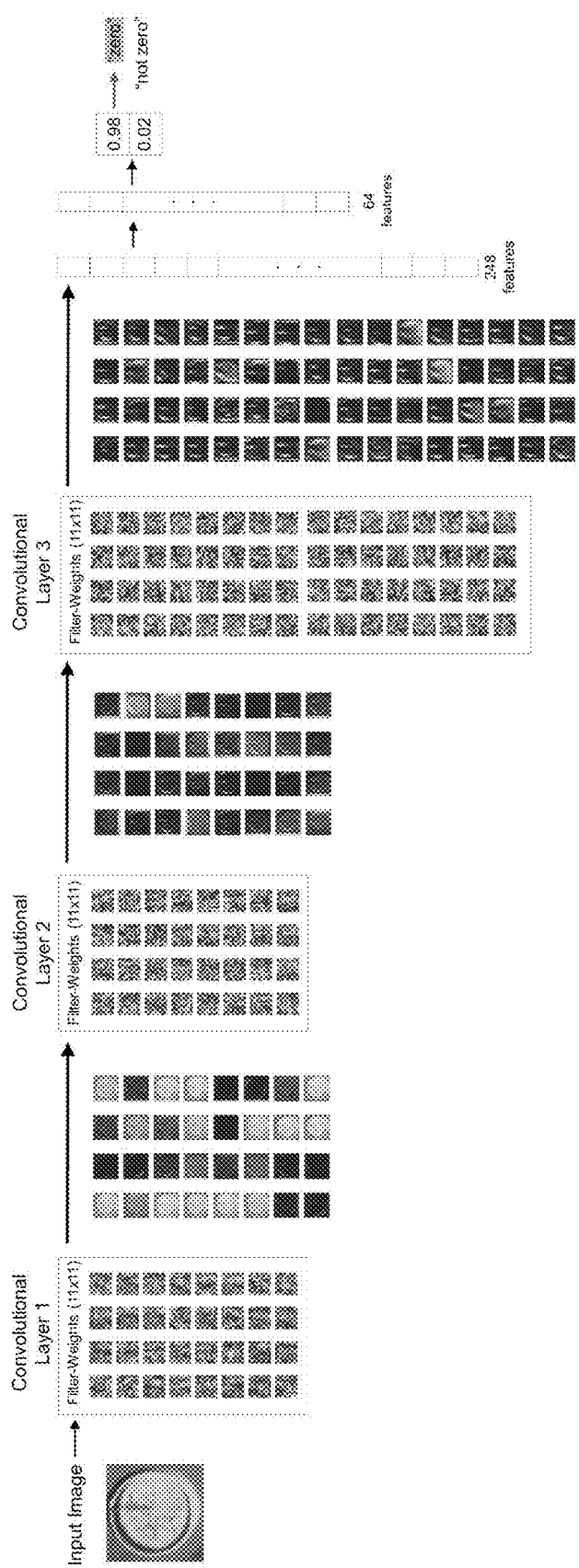
FIG. 6 shows an exemplary binary CNN for identifying whether an inlet pipe is at the northernmost point, in accordance with some embodiments of the technology described herein.

In some embodiments, the network may be designed based on a CNN architecture, e.g., VGG16, which uses small filters at increasing depths for large-scale image recognition. Because the task is to identify a feature that exists in a distinct and relatively small location relative to other applications of VGG16, a simplified version of the model with fewer layers may be used. Additionally, because these networks were developed for object classification and localization problems, while the task is identifying an angular location of a small object within an image, a new network may be trained rather than using a pretrained network. The general structure of the network is shown in FIGS. 2 and 6. FIG. 6 is an example of a trained binary CNN for identifying whether the inlet pipe is at the northernmost point. While the disclosure uses CNNs to illustrate the described techniques, the described techniques are not so limited and may use other suitable machine learning algorithms.

In some embodiments, improvement of the network's accuracy may be explored by using a grid search for the hyperparameters, including number of convolutional layers, number and size of the filters used in each convolutional layer, input image size, pooling type, use of a Sigmoid activation layer, and Optimizer type. The models may be evaluated on both performance in the binary classification part and voting part accuracy when applied to the exemplary angular feature extraction of the inlet pipe location.

Experimental Setup

Hyperparameter Selection:

In some embodiments, the algorithm utilizes a binary CNN, hyperparameters for which are selected by using a manual and grid search on the general network structure described above. Several experiments for selecting hyperparameters may be run across the following parameters:

Input image size: test four input image chip sizes: 32, 64, 128, and 256 pixels. The oil storage tank sizes vary from 34.5 to 125 pixels in diameter when each image chip is rescaled to the desired input chip size.

Number of convolutional layers: compare the use of 3 and 4 convolutional layers.

Number of filters in each layer:
  Use a series of 8, 16, and 32 filters; 16, 32, and 64 filters; and 32, 32, and 64 filters for the 3-layer networks.
  Use a series of 8, 16, 32, and 32 filters; 8, 16, 32, and 64 filters; 16, 32, 32, and 64 filters for the 4-layer networks.

Filter size:
  With an input image size of 32 pixels, compare filter sizes of 3 and 5 pixels.
  With an input image size of 64 pixels, compare filter sizes of 5 and 7 pixels.
  With an input image size of 128 pixels, compare filter sizes of 5, 7 and 11 pixels.
  With an input image size of 256 pixels, compare filter sizes of 7, 11, 15, and 19 pixels.

Activation function: evaluate the use of a Sigmoid activation function after the final linear layer.

Optimizer: compare RMSProp and Adam Optimizers.

A 70% training and 30% testing split may be created across the images while ensuring that images of the same tank are not included in both training and testing sets to avoid overfitting. For each image in each set, two data points may be created, one for each "angular" class, specifically the image is rotated so that the inlet pipe is located at the northernmost point, and the image is rotated so that the inlet pipe is in a random location that is not the northernmost point. This dataset may be used to select suitable hyperparameters for the CNN for binary classification. For cross-validation, the experiments may be run fully on two separate data splits.

Angular Feature Extraction:

In some embodiments, based on the analysis of hyperparameter selection, a suitable network structure may be chosen. This network may be used for angular feature extraction. The network may demonstrate improved accuracy of angular feature extraction, as described further below.

For this experiment, the same 70% training and 30% testing split across the images that are used for hyperparameter selection may be used. The training set may be augmented to create a training set for the CNN and split into 5 folds used to train 5 separate CNNs. The testing set may be used to test the angular feature extraction algorithm.

Results and Discussion

Figure 7A:
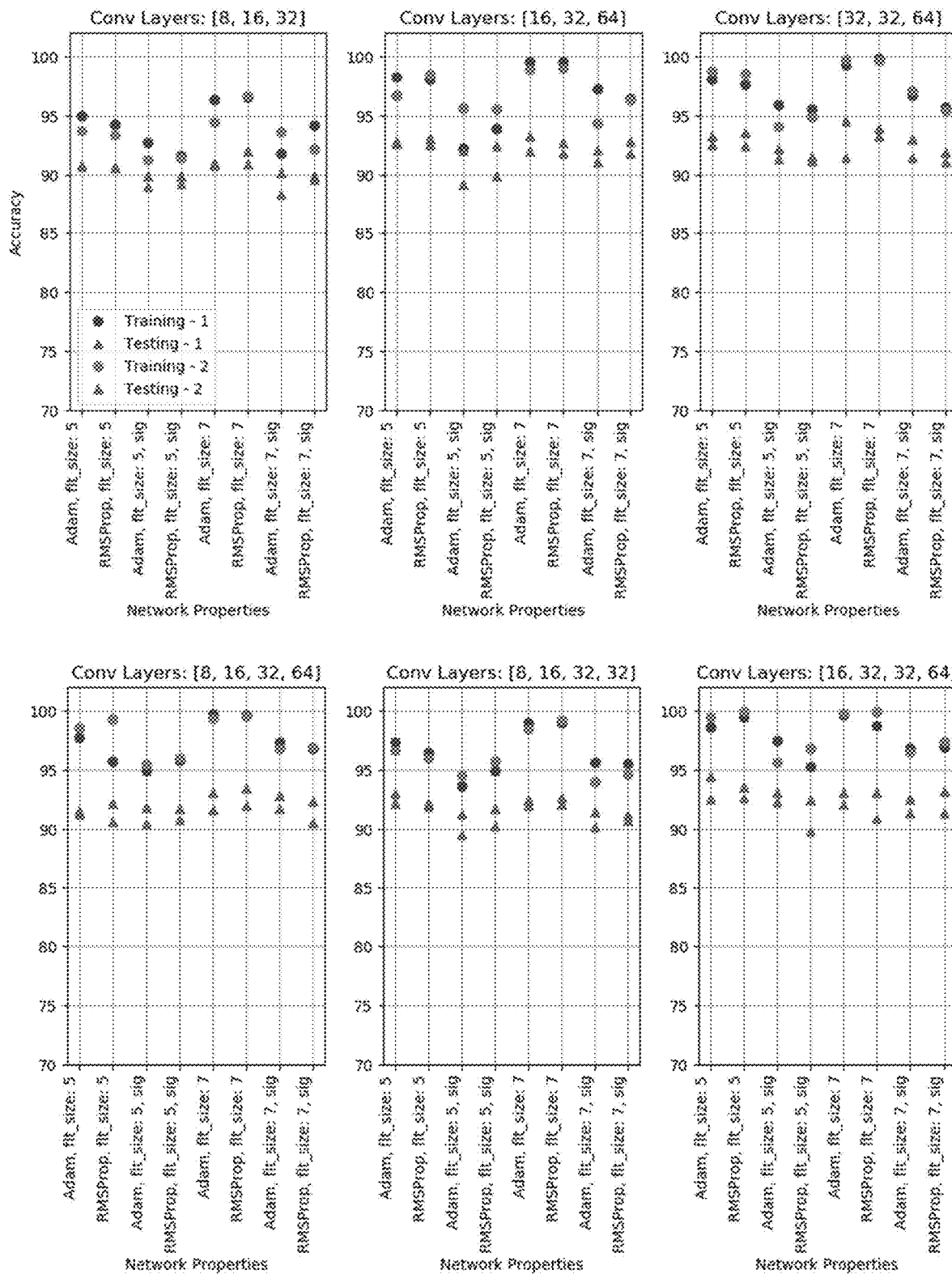
FIGS. 7A-7C show training and testing accuracy for different configurations of a CNN, in accordance with some embodiments of the technology described herein.
Figure 7B:
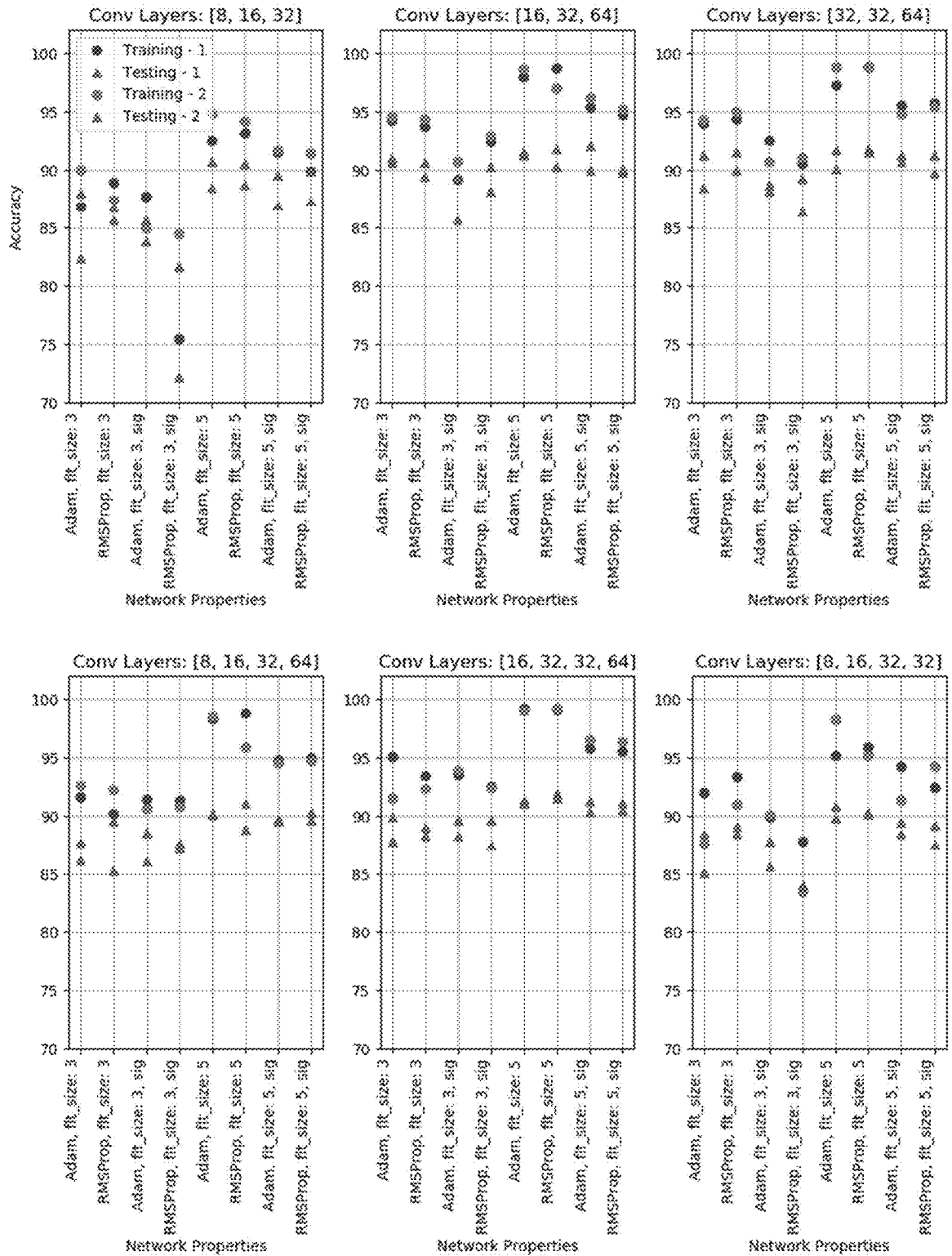
Figure 7C:
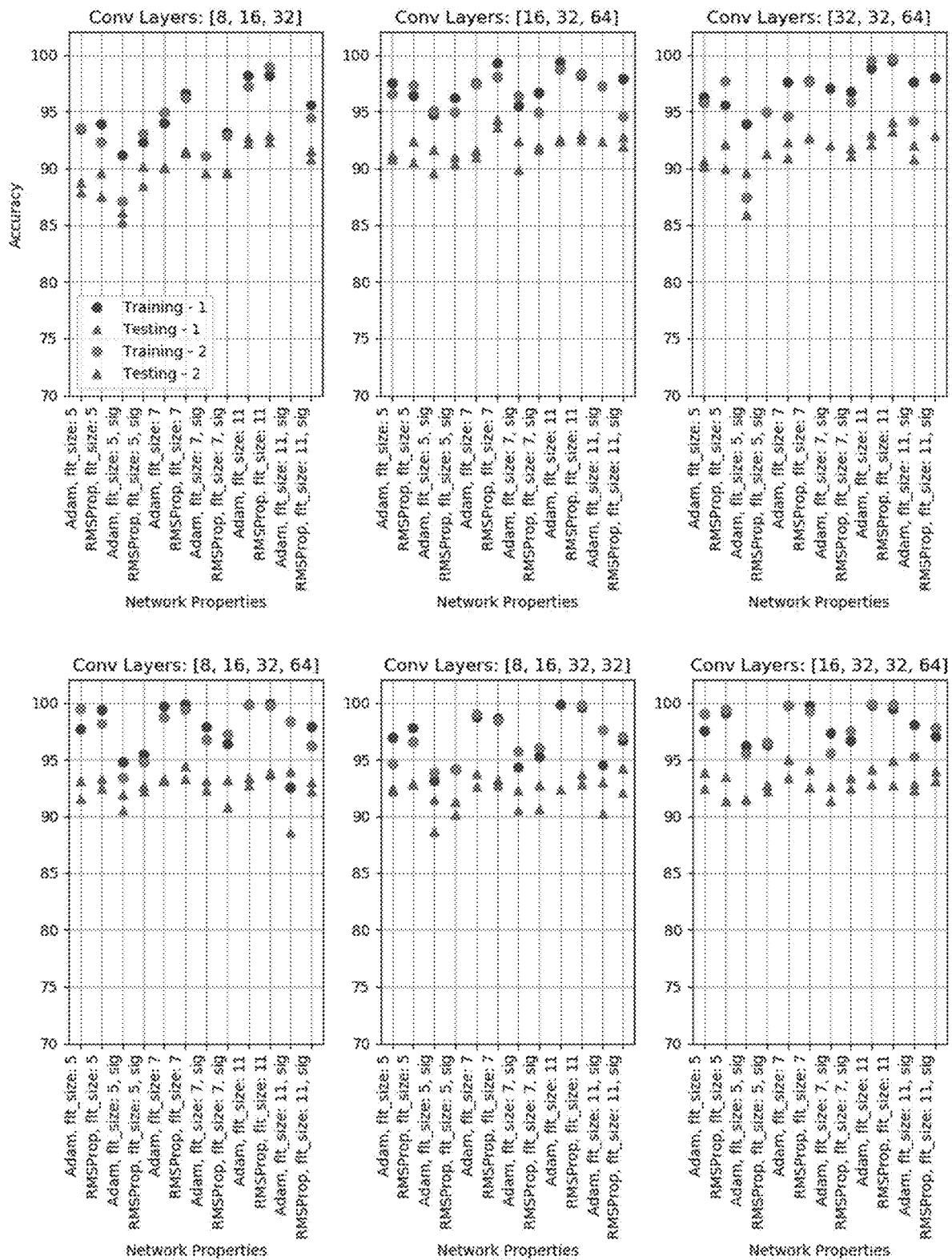
Figure 8A:
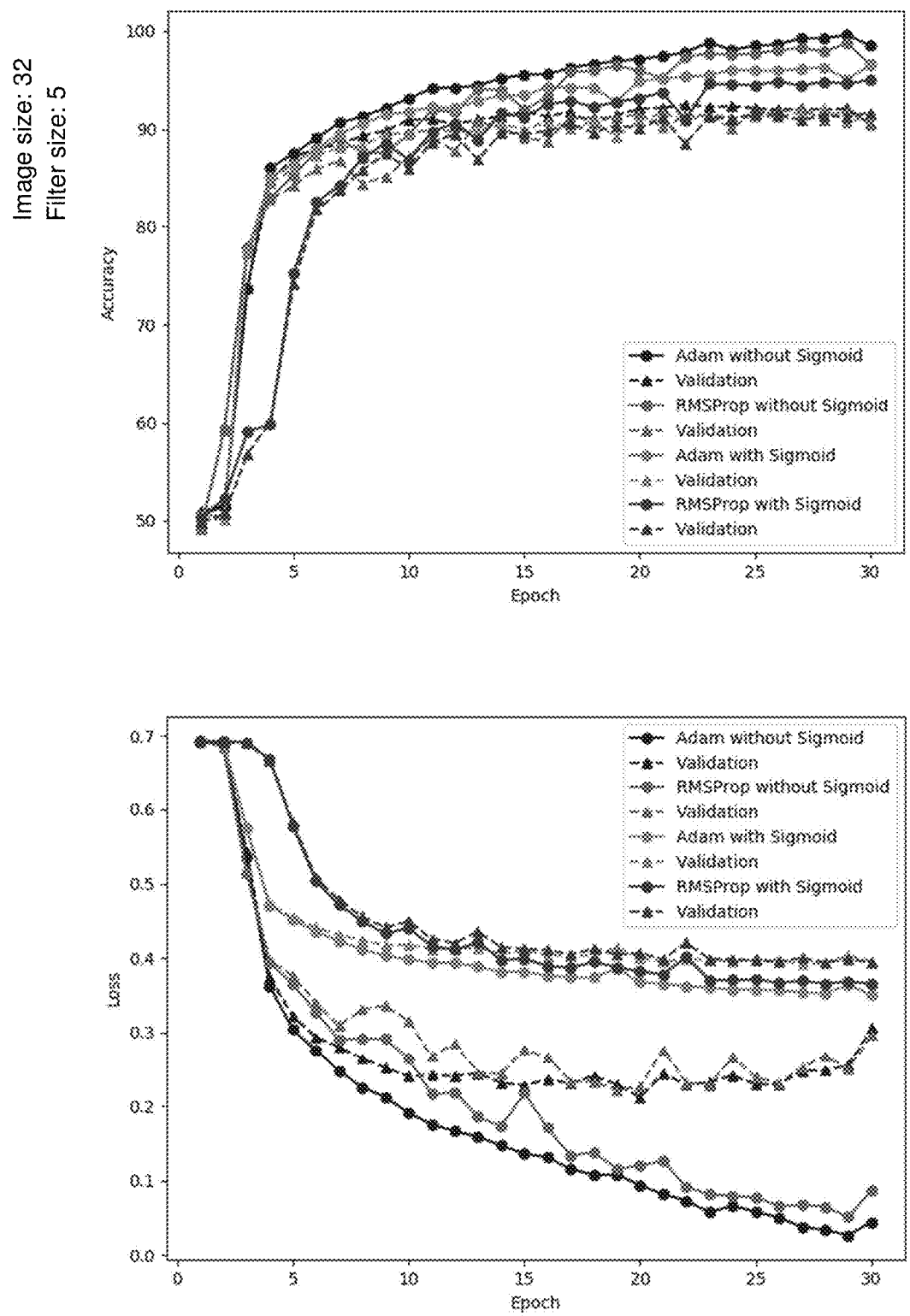
FIGS. 8A-8D accuracy and loss across training epochs for different image and filter sizes, in accordance with some embodiments of the technology described herein.
Figure 8B:
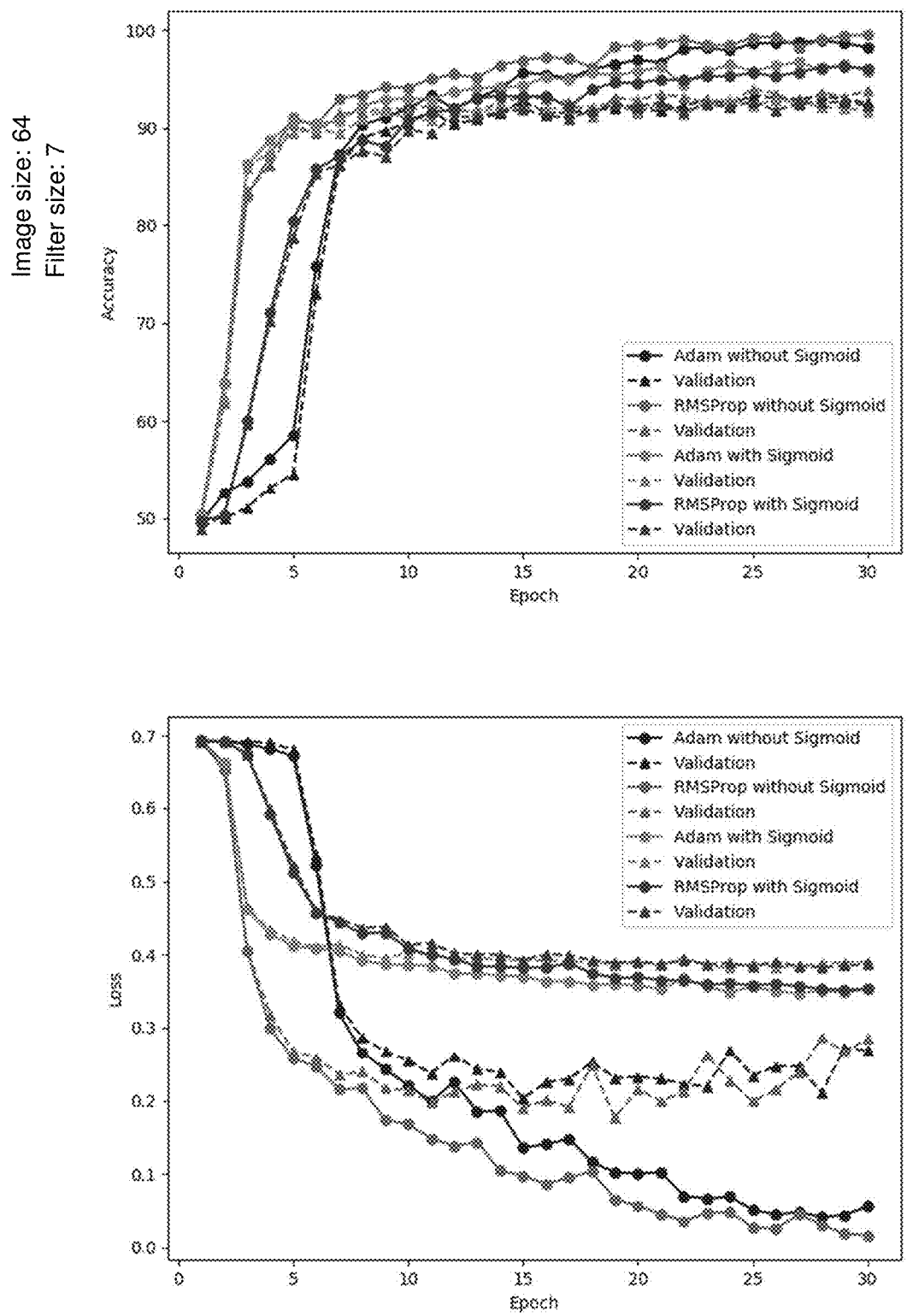
Figure 8C:
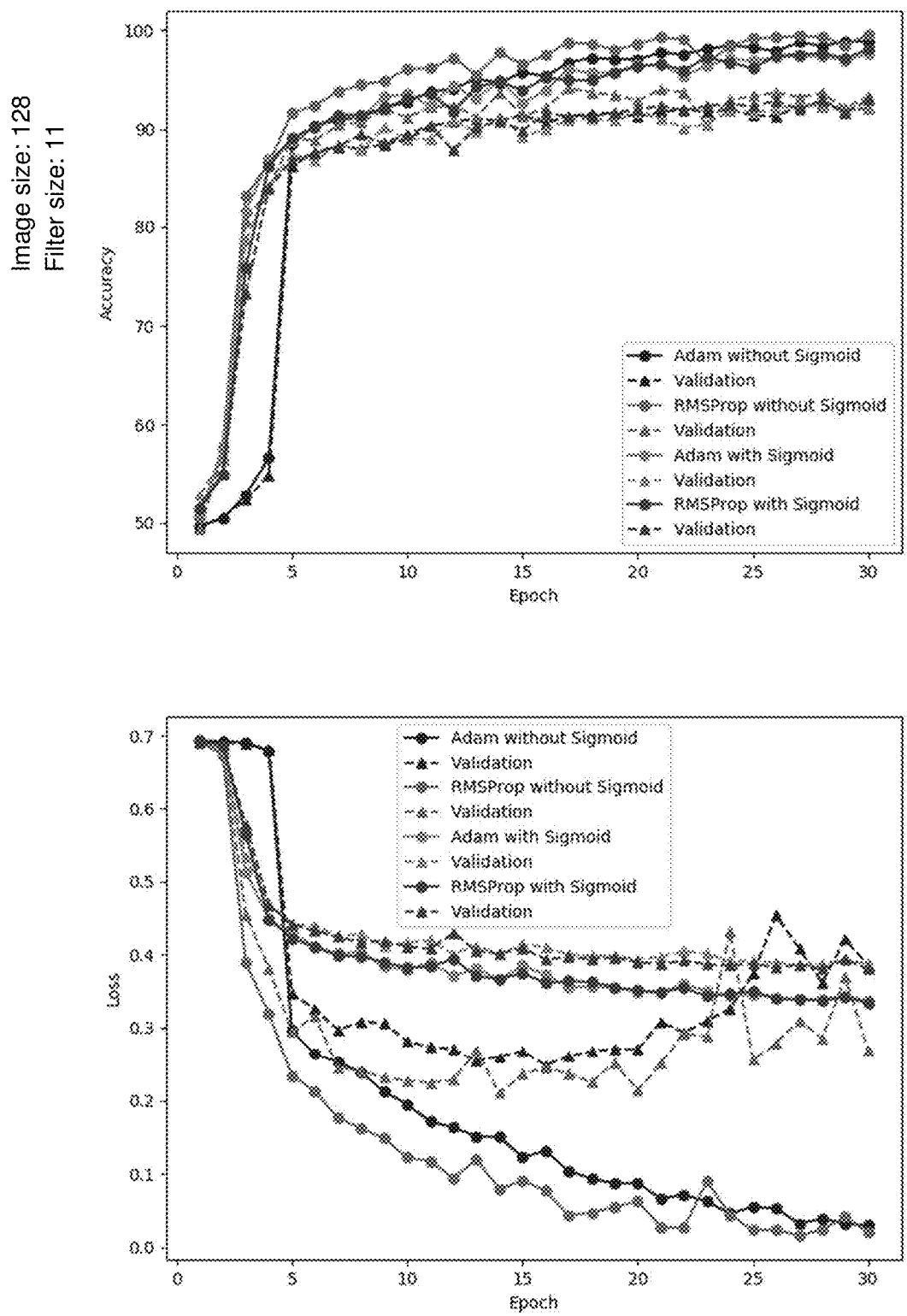
Figure 8D:
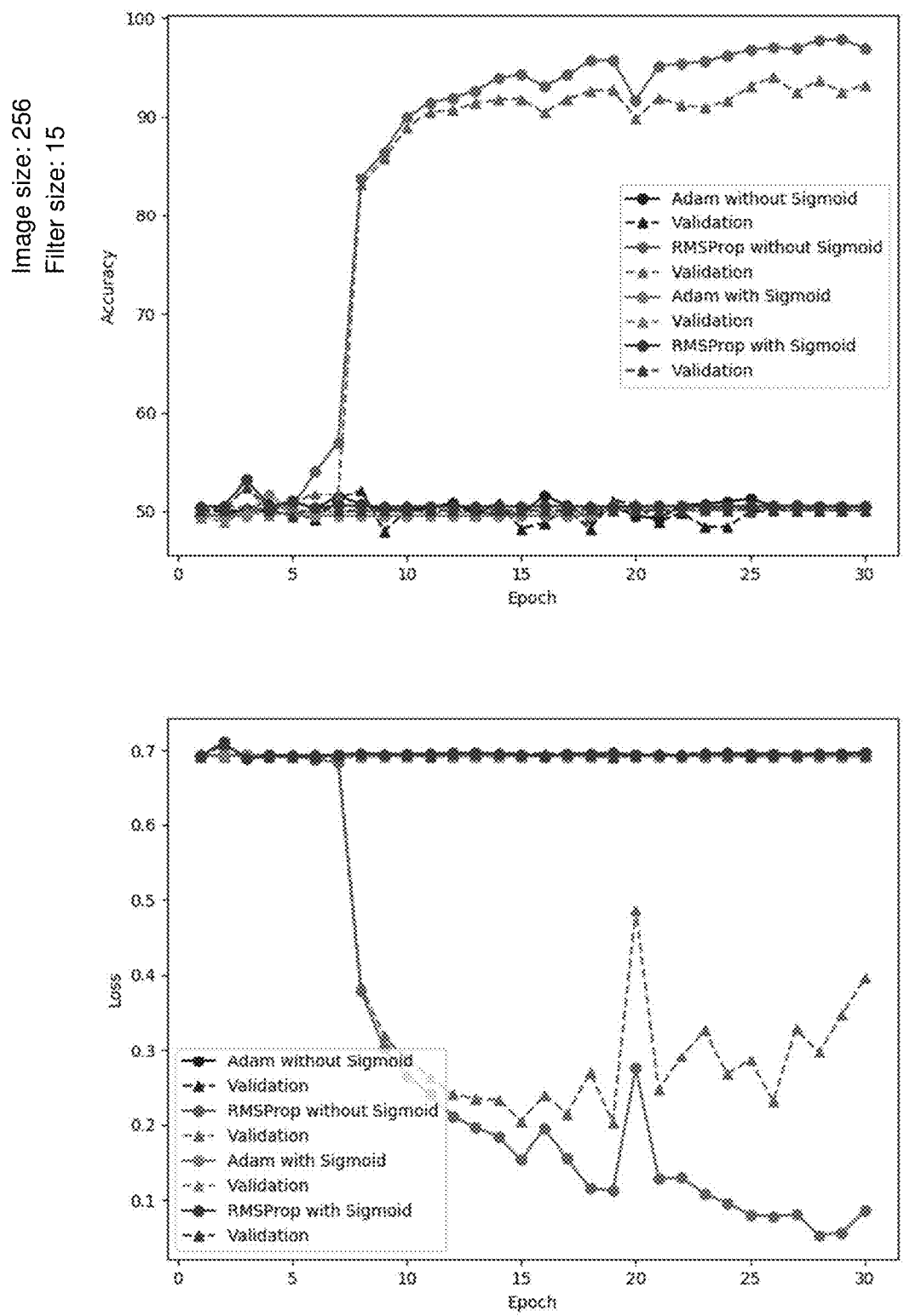

Hyperparameter Selection:

FIGS. 7A-7C shows the final training and testing accuracy for configurations of the network for input image sizes of 32 pixels (FIG. 7A), 64 pixels (FIG. 7B), and 128 pixels (FIG. 7C). Across the results, forgoing the use of a Sigmoid activation function may improve results by a 1-5% margin for the training accuracy, but may have less of an effect on the testing accuracy. In most cases, the use of the RMSProp Optimizer may perform at least as well as the Adam Optimizer. The use of larger filter sizes may improve testing accuracy by a 2-3% margin for the experiments with an input image size of 32 px, by a 1-2% margin when the image size is 64 px, and by a 0.5-1.5% margin when the image size is 128 px.

For these experiments, generally, the performance may increase as the number of convolutional layers and number of filters increases (looking at the FIGS. 7A-7C from left to right). Finally, an increase in input image size (looking at the FIGS. 7A-7C from top to bottom) may improve accuracy. Based on these experiments, it may be determined that using three convolutional layers with 32, 32, and 64 filters yields suitable results for the input image sizes. Increasing the number of convolutional layers may improve final accuracy by a small margin, but leads to larger computational burden.

FIGS. 8A-8D looks closer at the results of using 3 convolutional layers with 32, 32, and 64 filters and shows the accuracy and loss across 30 training epochs. FIGS. 8A-8D show the accuracy and loss across training epochs for input image size 32 px with 5 px filters (FIG. 8A), input image size 64 px with 7 pixel filters (FIG. 8B), input image size 128 px with 11 pixel filters (FIG. 8C), and input image size 256 px with 15 px filters (FIG. 8D), using 3 convolutional layers with 32, 32, and 64 filters. For each input image size, the use of Optimizer (RMSProp and Adam) and the use of a Sigmoid activation layer is compared. For an input image size of 128 px, asymptotic accuracy convergence may be reached sooner than when the input image size is set to 32 or 64 px. In contrast, when the input image size is set to 256 px, 3 out of 4 of the networks may fail to converge in accuracy, and for the one that does converge, it takes about 4-6 more training epochs to converge compared to convergence time for the smaller input image size cases.

In Table 1, an image size of 128 px may outperform both smaller options; however with continued increase the size, i.e., to 256 px, the performance may drop. Considering the size of the original tanks, specifically that tank sizes vary from 34.5 to 125 pixels in diameters, the plots indicate that it may be useful to not lose resolution for the largest tanks, but it may not be useful to stretch beyond this point.

Figure 9:
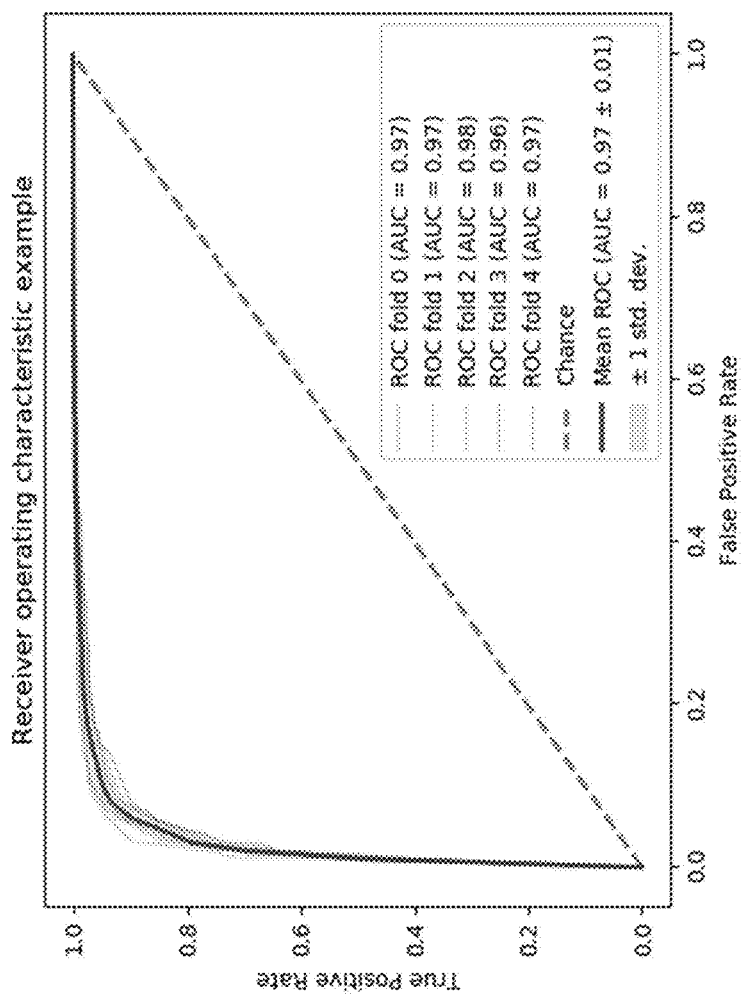
FIG. 9 shows a receiver operating characteristic (ROC) curve for an exemplary CNN, in accordance with some embodiments of the technology described herein.

In some embodiments, based on this analysis, it may be determined that a suitable network across the parameters that were tested is to use an input image size of 128 px, three layers with 32, 32, and 64 filters each with a filter size of 11 px, a Sigmoid activation layer prior to the output, and the use of an RMSProp Optimizer. FIG. 9 shows the training and testing accuracy across each training epoch for each of the 5 data folds as a ROC curve. In particular, FIG. 9 shows a ROC curve showing the results of a network with 3 convolution layers with 32, 32, and 64 filters, an input image size set to 128 px, a filter size of 11 px, a Sigmoid layer, and RMSProp Optimizer across 5 data folds. The plot indicates that very high True Positive Rate (TPR) may be achieved if allowed for a small False Positive Rate (FPR) of less than 0.2. This FPR may be further reduced by additional logic implemented on tank inlet pipe location, for example, by creating superresolved images of each tank from the m separate image acquisitions and running the CNN on the superresolved output, or by changing the voting scheme from average to a weighted average based on image quality.

Angular Feature Extraction:

In some embodiments, to analyze the performance of the angular feature extraction algorithm, the use of the above-determined network may be compared to a suboptimal network for the binary classification phase. For this experiment, the CNN has 3 layers with 32, 32, and 64 filters. A Sigmoid activation layer and an RMSProp Optimizer is used, and the use of an input image size of 32 px and 128 px is compared.

Figure 10:
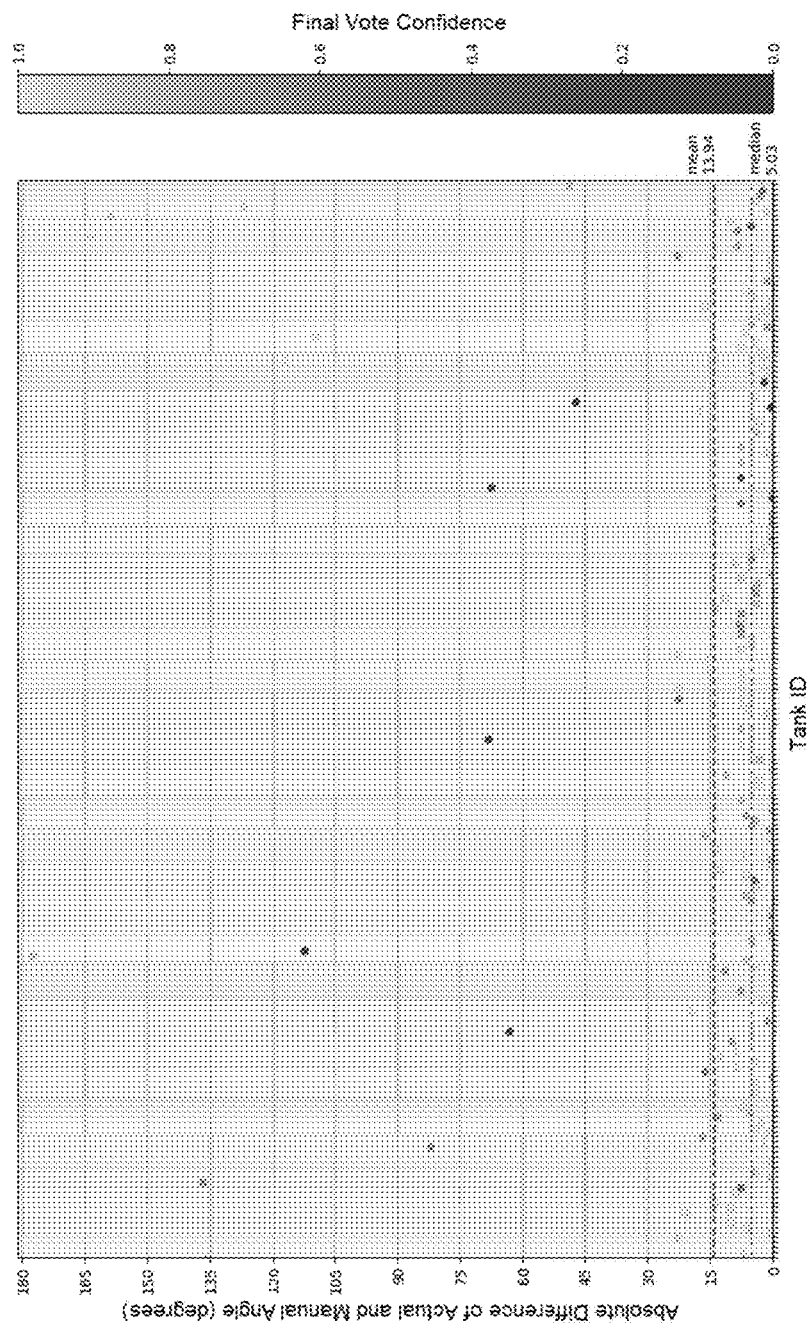
FIG. 10 illustrates exemplary results of angular feature extraction using a particular image size, in accordance with some embodiments of the technology described herein.

FIG. 10 shows the results of angular feature extraction using an input image size of 32 pixels. The CNN for this experiment has 3 layers with 32, 32, and 64 filters. A sigmoid activation layer and an RMSProp Optimizer are used. The plot shows the absolute difference between the true location and measured location across the tanks in the testing set. The final vote confidence is shown as the gradient. In FIG. 10, for the input image size of 32 px, 12.6% of the tanks were not able to be measured; of the remaining tanks, 85.6% were

TABLE 1

The final accuracy comparing input image size. The CNN for this experiment has 3 layers with 32, 32, and 64 filters, and a Sigmoid activation layer and an RMSProp Optimizer is used. Performance peaks when an input image size of 128 and filter size of 11 is used.

| | INPUT SIZE | | | | | | | |
|---|---|---|---|---|---|---|---|---|
| | 32 PX | | 64 PX | | 128 PX | | 256 PX | |
| | | | | FILTER SIZE | | | | |
| | 5 PX | | 7 PX | | 11 PX | | 19 PX | |
| FOLD | TRAIN | TEST | TRAIN | TEST | TRAIN | TEST | TRAIN | TEST |
| 1 | 94.12 | 90.49 | 94.78 | 90.77 | 96.43 | 92.60 | 94.25 | 91.77 |
| 2 | 94.57 | 90.54 | 94.00 | 91.32 | 95.88 | 92.10 | 95.15 | 91.94 |
| 3 | 94.86 | 90.99 | 94.96 | 91.27 | 96.28 | 93.11 | 94.05 | 90.49 |
| 4 | 92.81 | 90.43 | 95.69 | 92.21 | 95.90 | 91.66 | 94.44 | 91.49 |
| 5 | 93.04 | 89.26 | 94.75 | 90.77 | 96.74 | 92.33 | 93.79 | 92.16 |
| MEAN | 93.88 | 90.34 | 94.83 | 91.27 | 96.25 | 92.36 | 94.34 | 91.57 | within 15 degrees of the true angle. The mean difference was 13.94 degrees and the median difference was 5.03 degrees.

Figure 11:
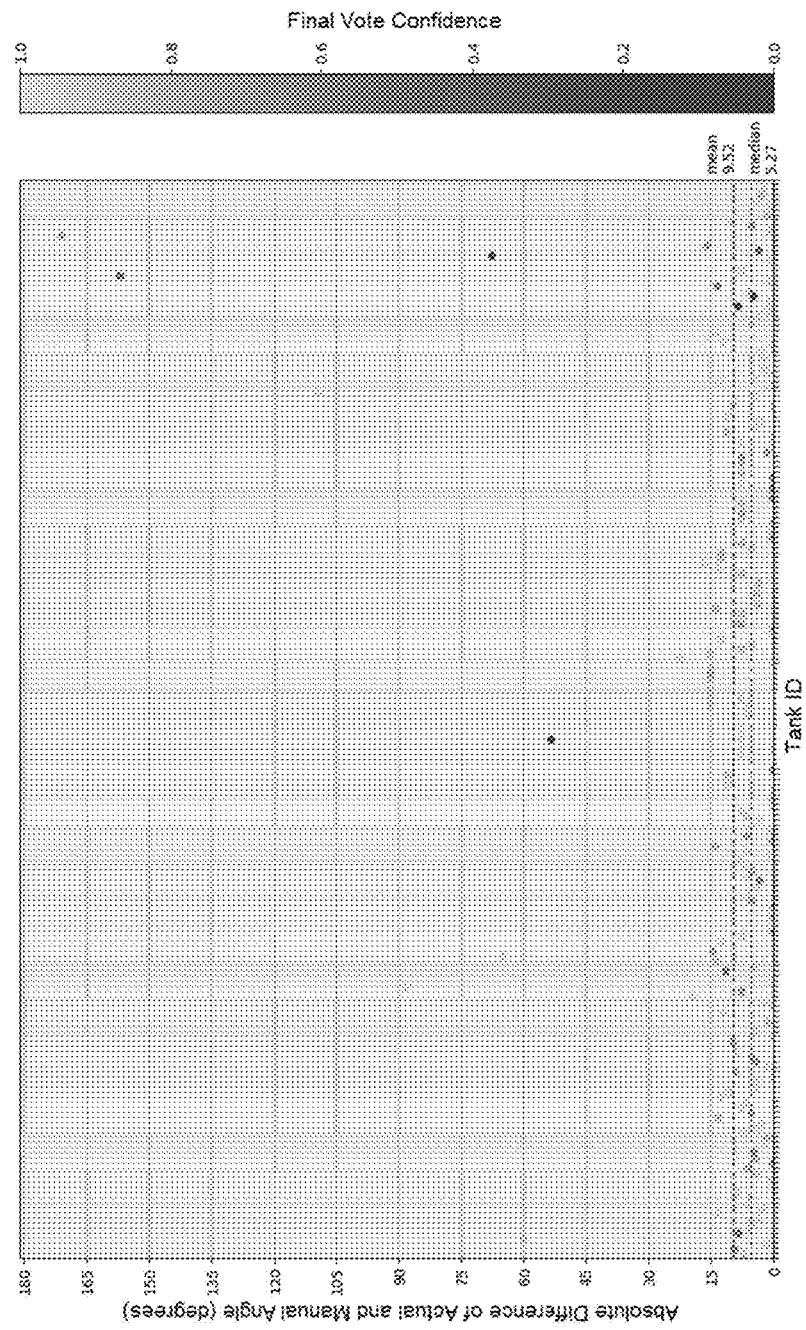
FIG. 11 illustrates exemplary results of angular feature extraction using another image size, in accordance with some embodiments of the technology described herein.

FIG. 11 shows the results of angular feature extraction using an input image size of 128 pixels. The CNN for this experiment has 3 layers with 32, 32, and 64 filters. A sigmoid activation layer and an RMSProp Optimizer are used. The plot shows the absolute difference between the true location and measured location across the tanks in the testing set. The final vote confidence is shown as the gradient. In FIG. 11, for the input image size of 128 px, 11.6% of the tanks were not able to be measured; of the remaining tanks, 93.8% were within 15 degrees of the true angle. The mean difference was 9.52 degrees and the median difference was 5.27 degrees.

Comparing the two results, the accuracy of the tanks that are able to be measured may be increased by a 6-7% margin when the larger image size is used. Additionally, the mean difference between the true angle and measured angle decreases by 4.5 degrees in the larger image size case. Therefore the use of the above-determined network may overall yield better results of angular feature extraction.

In some embodiments, an angular feature extraction algorithm for identifying the angular orientation of the inlet feature pipe, which is a common feature located on the top of cylindrical oil storage tanks, takes a two-part approach by using, first, a binary CNN to probabilistically determine if the inlet pipe is at a test orientation, and second, a voting algorithm to determine the most-likely position of the inlet pipe. In some embodiments, a systematic approach as described herein may be used to identify suitable hyperparameters for the CNN used for this application.

In some embodiments, the final accuracy of the binary classification is 96%+−2%. The final angular feature extraction obtained after the voting part has an accuracy of 94% (i.e., 94% of analyzed inlet pipes are within 15 degrees of the true angle measured manually). For angular feature extraction, 10% of tanks are not analyzed automatically by the voting classifier, which was found to be due to inherent tank properties by visual inspection. The mean error in angle estimation is approximately 10 degrees. The median error is approximately 5 degrees. The results may yield high enough accuracy to significantly improve the oil storage product and contribute to an automatic machine driven workflow. In some embodiments, the angular feature algorithm may be used for similar applications in which the orientation of an object in overhead imagery is desired. In some embodiments, the hyperparameter selection technique may be useful in expanding automation to additional workflows.

Example Computer/Software Implementations

Techniques operating according to the principles described herein may be implemented in any suitable manner. Included in the discussion is a flow chart showing the steps and acts of various processes for determining a rotational orientation of an object in an image. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc., that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary processes that could be implemented in one or more functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1206 of FIG. 12 described below (i.e., as a portion of a computing device 1200) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, or any other suitable system.

Figure 12:
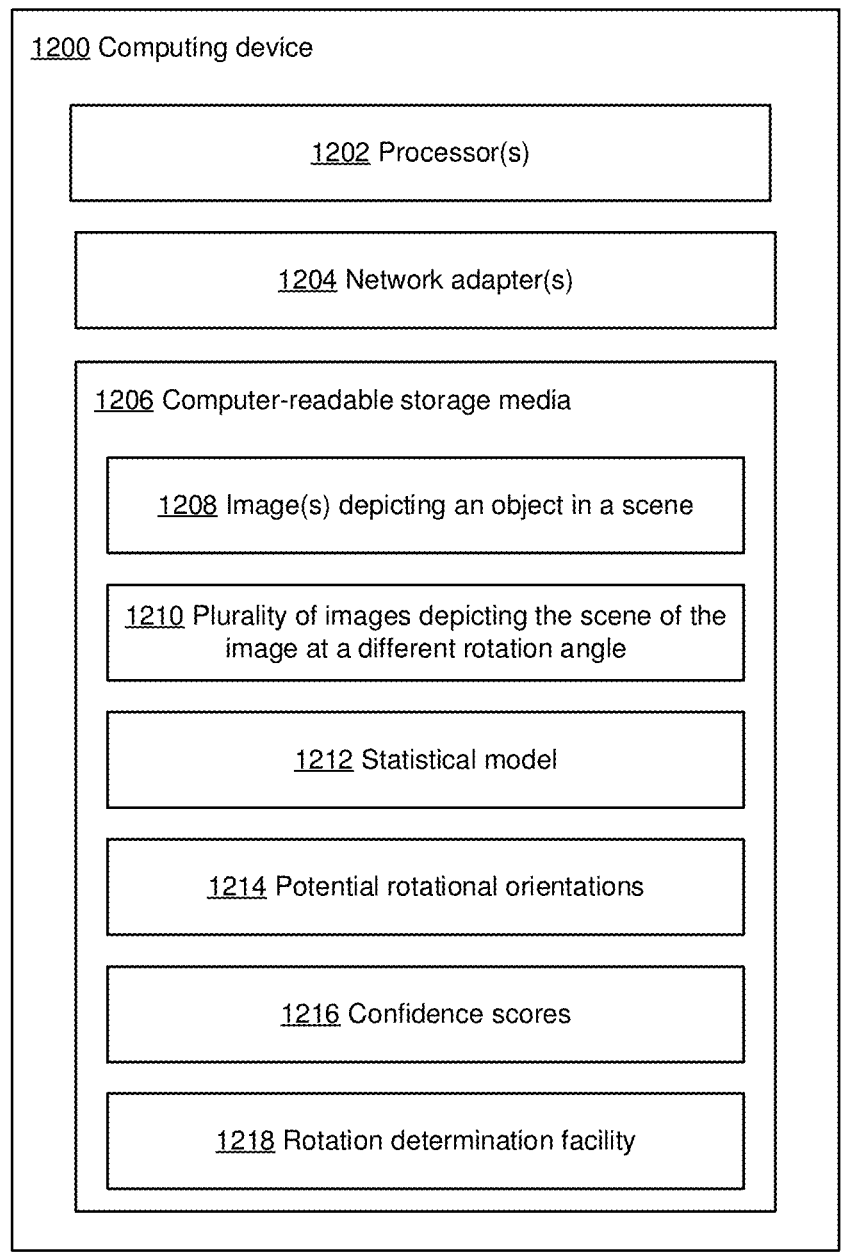
FIG. 12 illustrates an exemplary implementation of a computing device that may be used in a system implementing one or more techniques described herein.

FIG. 12 illustrates one exemplary implementation of a computing device in the form of a computing device 1200 that may be used in a system implementing techniques described herein, although others are possible. It should be appreciated that FIG. 12 is intended neither to be a depiction of necessary components for a computing device to operate in accordance with the principles described herein, nor a comprehensive depiction.

Computing device 1200 may comprise at least one processor 1202, a network adapter 1204, and computer-readable storage media 1206. Computing device 1200 may be, for example, a desktop or laptop personal computer, a personal digital assistant (PDA), a smart mobile phone, a server, a cloud computing platform, or any other suitable computing device. Network adapter 1204 may be any suitable hardware and/or software to enable the computing device 1200 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1206 may be adapted to store data to be processed and/or instructions to be executed by processor 1202. Processor 1202 enables processing of data and execution of instructions. The data and instructions may be stored on the computer-readable storage media 1206.

The data and instructions stored on computer-readable storage media 1206 may comprise computer-executable instructions implementing techniques which operate according to the principles described herein. In the example of FIG. 12, computer-readable storage media 1206 stores computer-executable instructions implementing various facilities and storing various information as described above. Computer-readable storage media 1206 may store one or more images 1208 depicting an object in a scene, a plurality of images 1210 depicting the scene of the image at a different rotation angle (e.g., derived from the image 1208), a statistical model 1212, potential rotational orientations 1214 (e.g., corresponding to some or all of the plurality of images 1210), confidence scores 1216 (e.g., generated by the statistical model 1212), and an orientation determination facility 1218 that may implement one or a combination of the techniques described above.

While not illustrated in FIG. 1200, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc., described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for determining a rotational orientation of an object in an image, the image depicting the object in a scene, the method comprising:
   providing a plurality of images depicting the object in the scene to a trained statistical model, wherein the plurality of images depict the scene of the image at different rotation angles, wherein a rotation angle of a respective image corresponds to a potential rotational orientation of the object depicted in the respective image;
   in response to the providing, receiving, for each of the plurality of images, a confidence score indicating a likelihood generated by the trained statistical model that the object is at the potential rotational orientation corresponding to the rotation angle of the respective image; and
   determining the rotational orientation of the object in the image based at least in part on an analysis of the confidence scores and respective potential rotational orientations.

2. The method of claim 1, wherein determining the rotational orientation of the object in the image comprises determining a respective potential rotational orientation with a highest confidence score.

3. The method of claim 1, wherein the plurality of images depicting the object in the scene is generated from a single image.

4. The method of claim 3, wherein the plurality of images includes 48 images generated by rotating the single image to 48 different rotation angles.

5. The method of claim 3, wherein the plurality of images is generated by successively rotating the single image in a fixed increment, d.

6. The method of claim 5, wherein the fixed increment is d degrees, and wherein the plurality of images includes 360°/d images.

7. The method of claim 1, wherein the statistical model includes a binary classification model.

8. The method of claim 7, wherein the binary classification model includes a binary classification convolutional neural network (CNN).

9. The method of claim 1, wherein the statistical model includes k statistical models trained to generate k confidence scores.

10. The method of claim 9, wherein the k statistical models include k CNNs.

11. The method of claim 9, wherein determining the rotational orientation of the object in the image comprises determining a respective potential rotational orientation with a highest average confidence score across the k statistical models.

12. The method of claim 9, wherein the plurality of images includes n images depicting the scene of the image at n different rotation angles.

13. The method of claim 12, wherein the image belongs to a temporal series of m images depicting the object in the scene.

14. The method of claim 13, further comprising:
   determining the rotational orientation of the object in the temporal series of m images based at least in part on an analysis of, from each plurality of n images for the temporal series of m images, the k confidence scores received from the plurality of k trained statistical models in response to the providing of the plurality of n images.

15. The method of claim 14, wherein determining the rotational orientation of the object in the temporal series of m images comprises:
   determining a plurality of n average confidence scores for the n different rotation angles, each average confidence score being based on mk confidence scores, received from the plurality of k trained statistical models, for m images corresponding to a same rotation angle from the plurality of n images for each of the temporal series of m images.

16. The method of claim 1, wherein the object is depicted in the image in a non-periodic manner.

17. The method of claim 1, wherein only one instance of the object is depicted in the image.

18. The method of claim 1, wherein the object depicted in the image is non-moving.

19. The method of claim 1, wherein no labeling is provided of the object depicted in the image.

20. A method for determining a rotational orientation of an object in an image, the image depicting the object in a scene, the method comprising:
   providing a plurality of images depicting the object in the scene to a trained statistical model to obtain an output relating to the rotational orientation of the object in the image, wherein the plurality of images depict the scene of the image at different rotation angles and wherein the statistical model is trained to generate a confidence score indicating whether the object is depicted in an input image at a fixed rotational orientation, wherein the providing the plurality of images to the trained statistical model comprises:
      for each image of the plurality of images,
         providing the image to the trained statistical model as the input image, and
         receiving in response to the providing of the image a confidence score generated by the trained statistical model indicating whether the image depicts the object at the fixed rotational orientation; and
      determining the rotational orientation of the object in the image based at least in part on an analysis of confidence scores received from the trained statistical model in response to the providing of the plurality of images.

21. A method for determining a rotational orientation of an object in a temporal series of images, the temporal series of images depicting an object in a scene, comprising:
- for each image in a temporal series of m images, providing a plurality of n images depicting the object in the scene to a plurality of k trained statistical models to obtain an output relating to the rotational orientation of the object, wherein the plurality of n images depict the scene of the image at n different rotation angles and wherein the plurality of k statistical models is trained to generate k confidence scores indicating whether the object is depicted in an input image at a fixed rotational orientation, wherein the providing the plurality of n images to the plurality of k trained statistical models comprises:
  - for each image of the plurality of n images,
    - providing the image to the plurality of k trained statistical models as the input image, and
    - receiving, in response to the providing of the image, k confidence scores generated by the plurality of k trained statistical models indicating whether the input image depicts the object at the fixed rotational orientation; and
- determining the rotational orientation of the object in the temporal series of m images based at least in part on an analysis of, from each plurality of n images for the temporal series of m images, the k confidence scores received from the plurality of k trained statistical models in response to the providing of the plurality of n images.

22. The method of claim 21, wherein determining the rotational orientation of the object in the temporal series of m images comprises:
- determining a plurality of n average confidence scores for the n different rotation angles, each average confidence score being based on mk confidence scores, received from the plurality of k trained statistical models, for m images corresponding to a same rotation angle from the plurality of n images for each of the temporal series of m images.

23. At least one non-transitory computer-readable storage medium having encoded thereon executable instructions that, when executed by at least one processor, cause the at least one processor to carry out a method for determining a rotational orientation of an object in an image, the image depicting the object in a scene, the method comprising:
- providing a plurality of images depicting the object in the scene to a trained statistical model, wherein the plurality of images depict the scene of the image at different rotation angles, wherein a rotation angle of a respective image corresponds to a potential rotational orientation of the object depicted in the respective image;
- in response to the providing, receiving, for each of the plurality of images, a confidence score indicating a likelihood generated by the trained statistical model that the object is at the potential rotational orientation corresponding to the rotation angle of the respective image; and
- determining the rotational orientation of the object in the image based at least in part on an analysis of the confidence scores and respective potential rotational orientations.

24. An apparatus comprising:
- at least one processor; and
- at least one storage medium having encoded thereon executable instructions that, when executed by the at least one processor, cause the at least one processor to carry out a method for determining a rotational orientation of an object in an image, the image depicting the object in a scene, the method comprising:
  - providing a plurality of images depicting the object in the scene to a trained statistical model, wherein the plurality of images depict the scene of the image at different rotation angles, wherein a rotation angle of a respective image corresponds to a potential rotational orientation of the object depicted in the respective image;
  - in response to the providing, receiving, for each of the plurality of images, a confidence score indicating a likelihood generated by the trained statistical model that the object is at the potential rotational orientation corresponding to the rotation angle of the respective image; and
  - determining the rotational orientation of the object in the image based at least in part on an analysis of the confidence scores and respective potential rotational orientations.

\* \* \* \* \*